United States Patent [19]

Bontrager

[11] 4,299,421
[45] Nov. 10, 1981

[54] TELESCOPIC TRAILER POST SUPPORT

[76] Inventor: Lloyd J. Bontrager, 58080 S.R. 13 South, Middlebury, Ind. 46540

[21] Appl. No.: 47,708

[22] Filed: Jun. 12, 1979

[51] Int. Cl.³ .............................................. B60P 3/34
[52] U.S. Cl. ..................................... 296/27; 296/171; 403/109
[58] Field of Search .................... 296/27, 171, 175, 26; 52/66; 280/47.17; 285/DIG. 22; 403/109, 105

[56] References Cited

U.S. PATENT DOCUMENTS

| | | | |
|---|---|---|---|
| 2,790,657 | 4/1957 | Wilder | 403/105 |
| 2,925,283 | 2/1960 | Stilger | 280/47.17 X |
| 3,161,395 | 12/1964 | Carter | 403/105 X |
| 3,495,866 | 2/1970 | Bontrager | 296/27 |
| 3,514,150 | 5/1970 | Wallace | 296/27 X |
| 3,519,306 | 7/1970 | Young | 296/27 |
| 3,606,372 | 9/1971 | Browning | 280/47.17 |
| 3,674,305 | 7/1972 | Steury | 296/27 |
| 3,885,826 | 5/1975 | Kropf | 296/171 |
| 4,076,437 | 2/1978 | Mazzolla | 403/109 X |
| 4,079,978 | 3/1978 | McMullin | 403/109 X |
| 4,104,000 | 8/1978 | Fleischmann | 403/109 X |
| 4,135,274 | 1/1979 | Freeman | 403/109 X |
| 4,171,843 | 10/1979 | Steury | 296/27 |
| 4,194,785 | 3/1980 | Gail | 296/27 X |

Primary Examiner—Joseph F. Peters, Jr.
Assistant Examiner—Norman L. Stack, Jr.
Attorney, Agent, or Firm—Oltsch, Knoblock and Hall

[57] ABSTRACT

A telescopic support post for a trailer with a shiftable top. The support includes guides which serve to direct the motion of the telescoping parts and also to inhibit moisture, such as from rain, from getting between the telescopic parts of the post.

2 Claims, 4 Drawing Figures

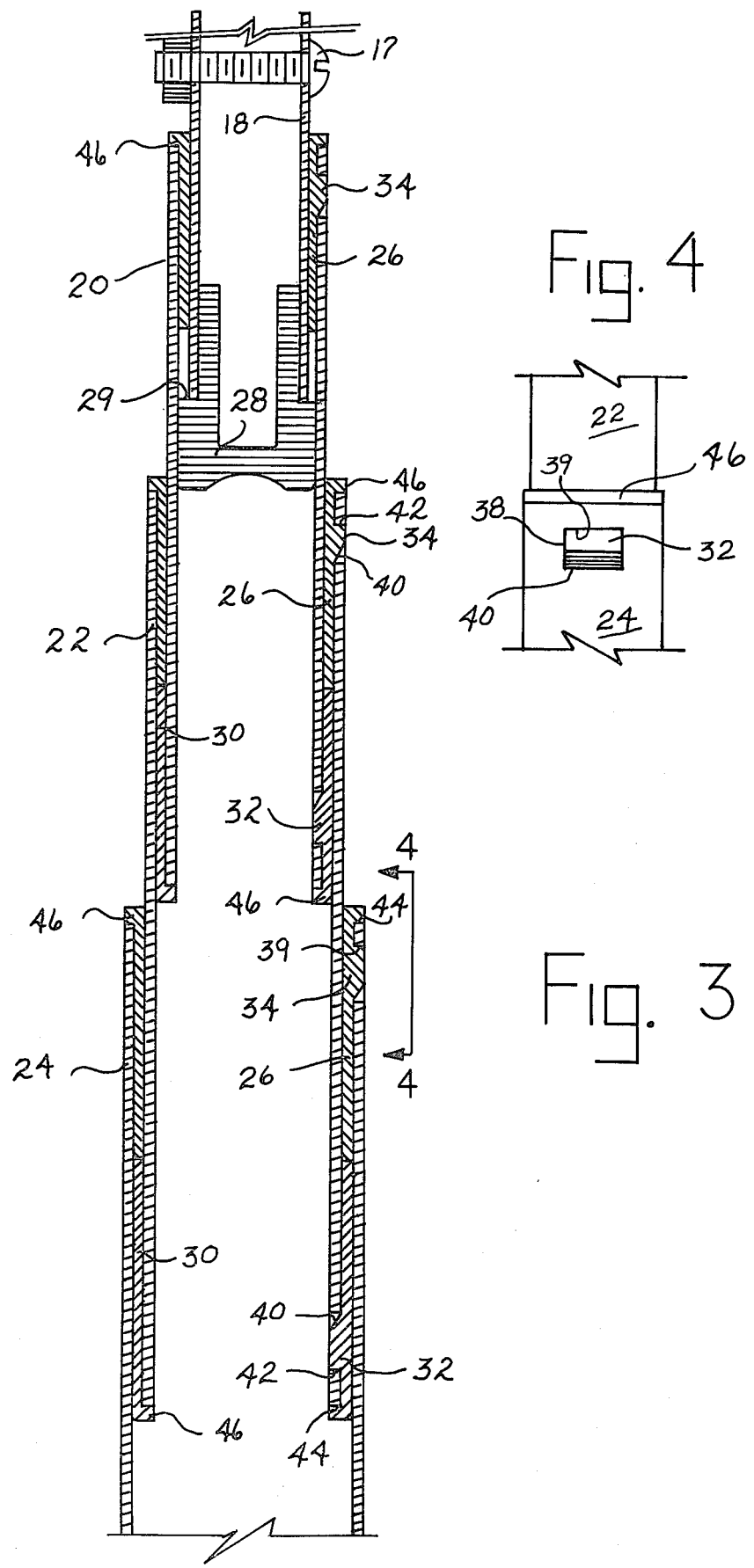

TELESCOPIC TRAILER POST SUPPORT

SUMMARY OF THE INVENTION

This invention relates to an improvement in telescopic support posts for recreational vehicles such as trailers. More specifically the invention relates to guides for the support posts which can inhibit separation of the posts upon extension. The invention relates to a recreational vehicle of the type shown in my U.S. Pat. No. 3,495,866, dated Feb. 17, 1970.

The telescopic posts of collapsible recreational vehicles have necessarily employed guides to inhibit lateral motion of the individual sections of the posts. Lateral motion of the telescopic sections leads to instability in the post and therefore is to be avoided. Additionally, guides have been utilized to prevent over extension or separation of the interfitting telescopic sections. Such guides are shown in U.S. Pat. No. 3,885,826. In this patent, however, lugs extended perpendicularly from each guide to keep it in place within its post section. This embodiment can be prone to failure due to shearing of the lugs under use of the guides. This invention solves such a problem through the utilization of a protrusion formed upon each guide with a flat shoulder and an opposite bevelled cam surface. The protrusion is fitted into an opening in a post section to prevent movement of the guide upon longitudinal movement of the section and abutment with another guide. Each guide also has a rib which overlies the end edge of its post section to interlock the guide to the section.

Accordingly it is an object of this invention to provide a telescopic support which is for a trailer and which is guidably prevented from separating upon extension.

Another object of this invention is to provide a guide for a telescopic support post which is for a recreational vehicle and which is resistant to failure due to shearing.

Another object of this invention is to provide a telescopic post having guide means for protecting the interior of the telescopic sections of the post from the elements, such as water and dirt.

Other objects will become obvious upon a reading of the following description.

BRIEF DESCRIPTION OF THE DRAWINGS

FIG. 3 is a fragmentary sectional view of the telescopic post in extended form.

FIG. 4 is a fragmentary view as seen from line 4—4 of FIG. 3.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
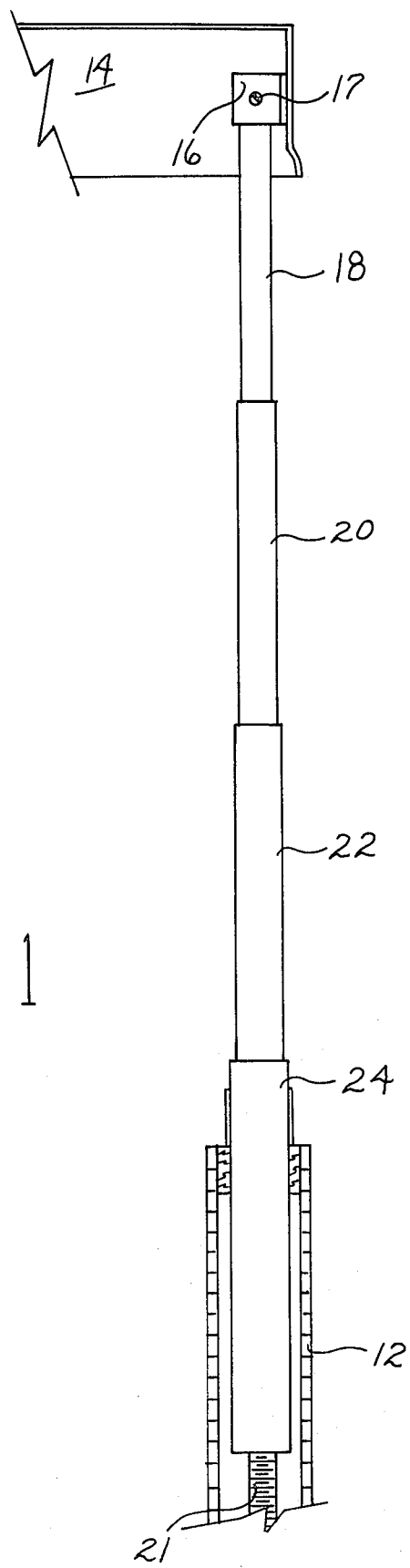
FIG. 1 is a fragmentary side view of the trailer corner showing the telescopic post connecting the body to the top of the trailer.
Figure 2:
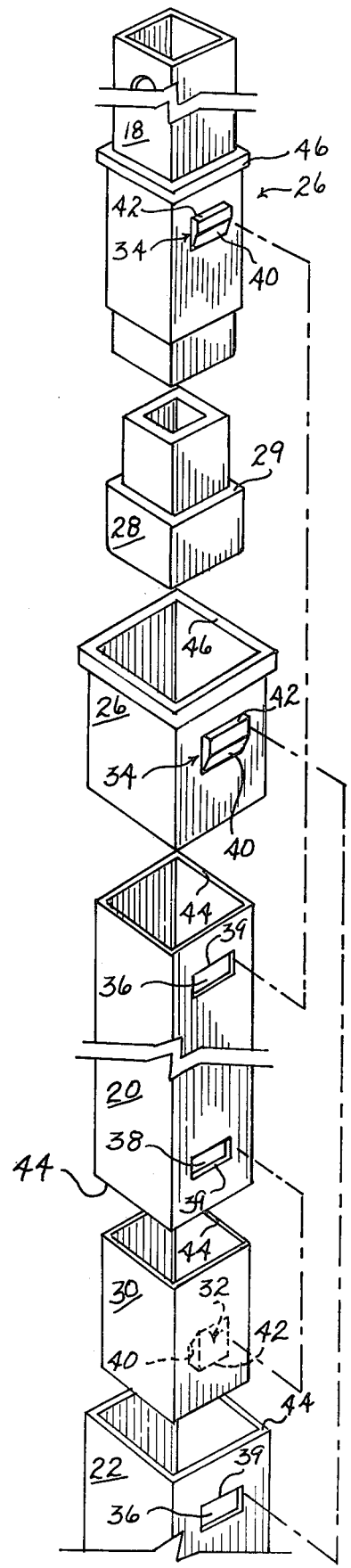
FIG. 2 is a fragmentary exploded perspective view of the individual parts of the telescopic post.

FIG. 1 illustrates post 10 in use. Post 10 extends from the lower body of the trailer through a lower guide tube 12 at each corner of the body as shown in U.S. Pat. No. 3,495,866, incorporated herein by reference. A top 14 is supported by each post 10 at attachment 16. Each post 10 includes a plurality of telescopic sections 18, 20, 22, 24. The inter-connection of sections 18, 20, 22, 24 is illustrated in FIG. 2. Section 18 which is connected to attachment 16 by a screw member 17 carries a plug 28 in its lower end. Plug 28 fits slidably into the upper end of section 20 and includes a stop shoulder 29. An upper guide 26 fits into the upper end of section 20 and includes an external protrusion 34 which fits into an opening 36 formed in the upper end portion of section 20. Similarly, an upper guide 26 fits into the upper end of section 22 and 24. A lower guide 30 fits about the lower end of each section 20 and 22. Each lower guide 30 includes an internal protrusion 32 which fits into an opening 38 formed in the lower end portion of section 20, 22.

Each protrusion 32, 34 includes a flat shoulder 42 and an oppositely located bevelled camming surface 40. Each guide 26, 30 includes an end rib 46 which preferably extends about the guide and which has a part oppositely located in a spaced relationship from protrusion shoulder 42 of the guide. Guide 26, 30 is connected to its post section 18, 20, 22, 24 by being inserted into or placed about the section, as the case may be, with its protrusion camming surface 40 first contacting end edge 44 of the section to cam the protrusion 32, 34 over the section surface until protrusion shoulder 42 is snap fitted into section opening 36, 38. With protrusion shoulder 42 fitted in a section opening, the shoulder will abut edge 39 of the opening and guide rib 46 will abut end edge 44 of the section to firmly secure the guide to the post section. Post sections 18–24 are usually formed of a metal material, such as steel, and guides 26, 30 are preferably formed of a flexible shape-retaining material, such as nylon, to facilitate connection of the guides to the sections.

Guides 26, 30 serve not only as means for guiding the extending and retracting movement of the post sections 18–24 but also as stops which limit the extension of the sections and as seals for protecting the interior of the sections from water and dirt. A pusher spring 21 extends internally through each post 10 and abuts plug 28. Upward movement of spring 21 serves to extend post 10 and raise top 14 of the trailer.

It is to be understood that the invention is not to be limited by the preceding but may be modified within the scope of the appended claims.

What I claim is:

1. In a collapsible vehicle having a body and a top shiftable between a collapsed position on said body and an elevated position above said body, a telescopic post carried by said body adjacent each corner thereof and engaging said top and having inner and outer telescopic parts, means for shifting said top between its collapsed and elevated positions, the improvement wherein each telescopic part has an upper and lower end portion, the lower end portion of said inner part carrying a first guide, the upper end portion of said outer part carrying a second guide, the lower portion of said inner part including an end edge, the upper end portion of said outer part including an end edge, an opening formed in said lower end portion and spacedly from said end edge of the inner part, an opening formed in said upper end portion and spacedly from said end edge of the outer part, each guide means including a protrusion having a flat shoulder part and an oppositely located bevelled shoulder part, said first guide means fitted about the lower end portion of said inner part with the protrusion thereof extending into said opening in the inner part, said second guide means fitted into the upper end portion of said outer part with the protrusion thereof extending into said opening of the outer part, said protrusion shoulder of each guide means restrictively abutting the edge of said opening in the part end portion interfitting with the guide means to interlock the guide means with each portion, each protrusion bevelled shoulder part constituting means for guidably seating the protrusion into a said part end portion opening as the guide means is fitted about or into its accommodating end portion whereby the guide means is fixedly secured to the end portion in a sheer resistant manner, said guide means constituting abutment means for preventing separation of said inner and outer parts upon extension of such parts.

2. The vehicle of claim 1 wherein each said guide means includes a rib, said rib overlying the end edge of the part end portion interfitting with the guide means.

* * * * *